US011242879B2

(12) United States Patent
Kolb et al.

(10) Patent No.: US 11,242,879 B2
(45) Date of Patent: Feb. 8, 2022

(54) CLIP WITH A HEAD AND A SHANK EXTENDING FROM THE HEAD ALONG A LONGITUDINAL AXIS

(71) Applicant: A. Raymond et Cie, Grenoble (FR)

(72) Inventors: Christian Kolb, Binzen (DE); Daniel Schreiyäck, Eimeldingen (DE)

(73) Assignee: A. RAYMOND ET CIE, Grenoble (FR)

( * ) Notice: Subject to any disclaimer, the term of this patent is extended or adjusted under 35 U.S.C. 154(b) by 285 days.

(21) Appl. No.: 16/315,614

(22) PCT Filed: Jun. 30, 2017

(86) PCT No.: PCT/EP2017/000778
§ 371 (c)(1),
(2) Date: Jan. 4, 2019

(87) PCT Pub. No.: WO2018/007001
PCT Pub. Date: Jan. 11, 2018

(65) Prior Publication Data
US 2020/0116185 A1    Apr. 16, 2020

(30) Foreign Application Priority Data
Jul. 4, 2016    (DE) .......................... 102016008022.1

(51) Int. Cl.
*F16B 21/08*    (2006.01)
*B60R 13/02*    (2006.01)
*B60R 21/20*    (2011.01)

(52) U.S. Cl.
CPC ........ *F16B 21/086* (2013.01); *B60R 13/0206* (2013.01); *B60R 21/20* (2013.01); *Y10T 24/309* (2015.01); *Y10T 24/42* (2015.01)

(58) Field of Classification Search
CPC ... F16B 21/086; B60R 13/0206; B60R 21/20; Y10T 24/309; Y10T 24/44026; Y10T 24/303; Y10T 24/42
See application file for complete search history.

(56) References Cited

U.S. PATENT DOCUMENTS 3,177,540 A     4/1965  Hall et al.
6,305,055 B1 *  10/2001 Castro ................... F16B 21/086
                                                        24/458

(Continued)

FOREIGN PATENT DOCUMENTS

DE        10006593      11/2000
EP         1989451      11/2008

(Continued)

OTHER PUBLICATIONS

Machine Translation of JP2014020466A retrieved from ESPACENET Dec. 1, 2020 (Year: 2020).*

*Primary Examiner* — Robert Sandy
*Assistant Examiner* — Michael S Lee
(74) *Attorney, Agent, or Firm* — Warner Norcross + Judd LLP

(57) ABSTRACT

A clip with a head and a shank extending along a longitudinal axis from the head in which ribs are provided, each rib extending from a base of the respective rib on the shank to an end of the respective rib radially spaced from the base of the respective rib,
a rib is connected in sections directly to the head,
a rib has an elastic arm which protrudes from the respective rib,
a rib has a side extending between the rib base and the rib end, wherein the elastic arm of this rib protrudes from this side of the rib,
an elastic arm having first and second sections, the first section being connected at one end to the rib and at its (Continued)

other end to the second section, the second section extending in a different direction from the first section, the first section is connected directly to the head.

19 Claims, 10 Drawing Sheets

(56) References Cited

U.S. PATENT DOCUMENTS

| | | | |
|---|---|---|---|
| 7,967,539 B2 | 6/2011 | Huet | |
| 2008/0128149 A1 | 6/2008 | Kearby et al. | |
| 2009/0188086 A1 | 7/2009 | Okada et al. | |
| 2009/0265900 A1* | 10/2009 | Okada | F16B 21/086 |
| | | | 24/458 |
| 2010/0322743 A1 | 12/2010 | Ostergren | |
| 2015/0128386 A1* | 5/2015 | Lepper | F16B 5/0657 |
| | | | 24/458 |
| 2015/0135484 A1* | 5/2015 | Leverger | F16B 13/045 |
| | | | 24/292 |
| 2018/0202478 A1* | 7/2018 | Horimizu | F16B 17/00 |

FOREIGN PATENT DOCUMENTS

| | | |
|---|---|---|
| EP | 2404067 | 1/2012 |
| EP | 2855950 | 4/2015 |
| JP | 2014020466 | 2/2014 |
| WO | 2011115906 | 9/2011 |
| WO | 2012104250 | 8/2012 |

* cited by examiner

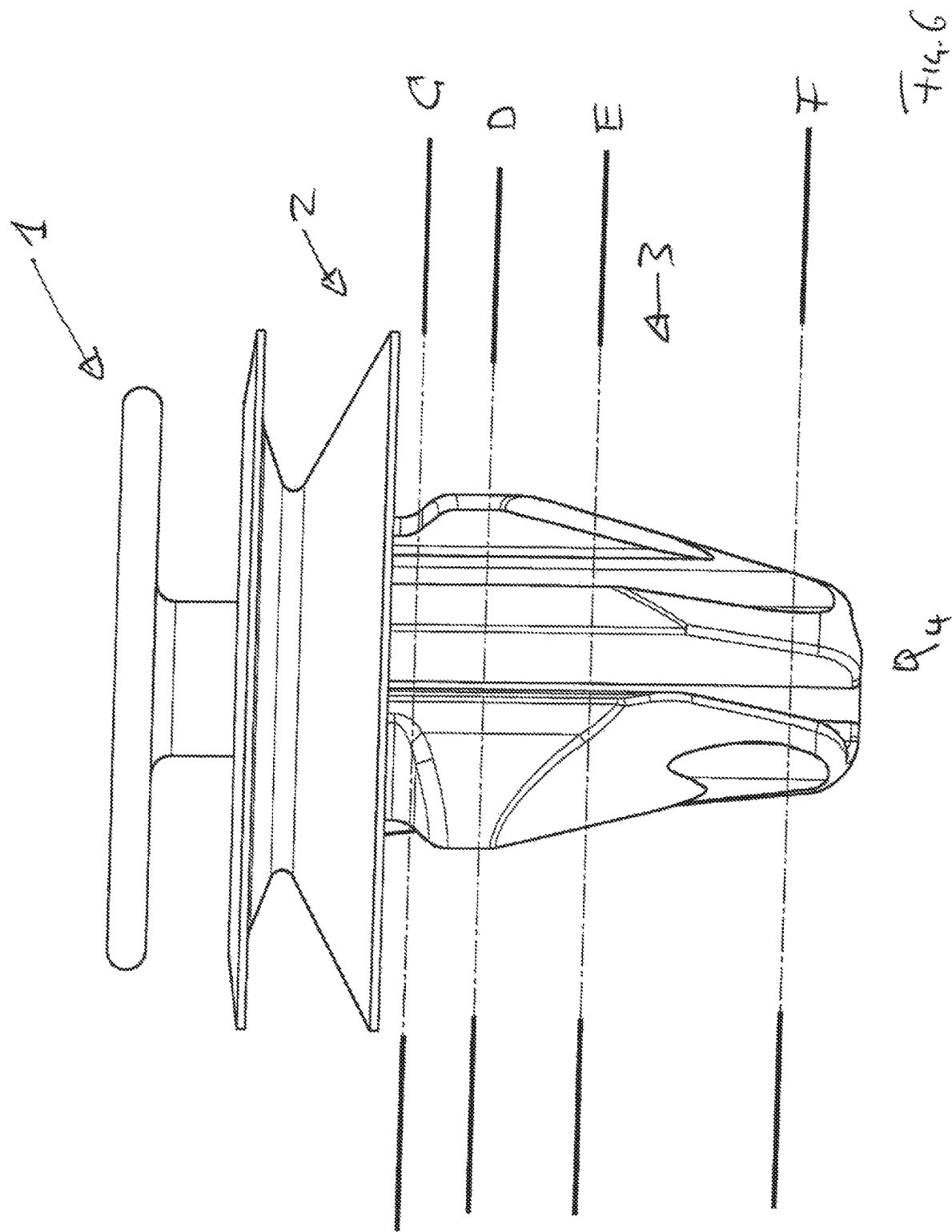

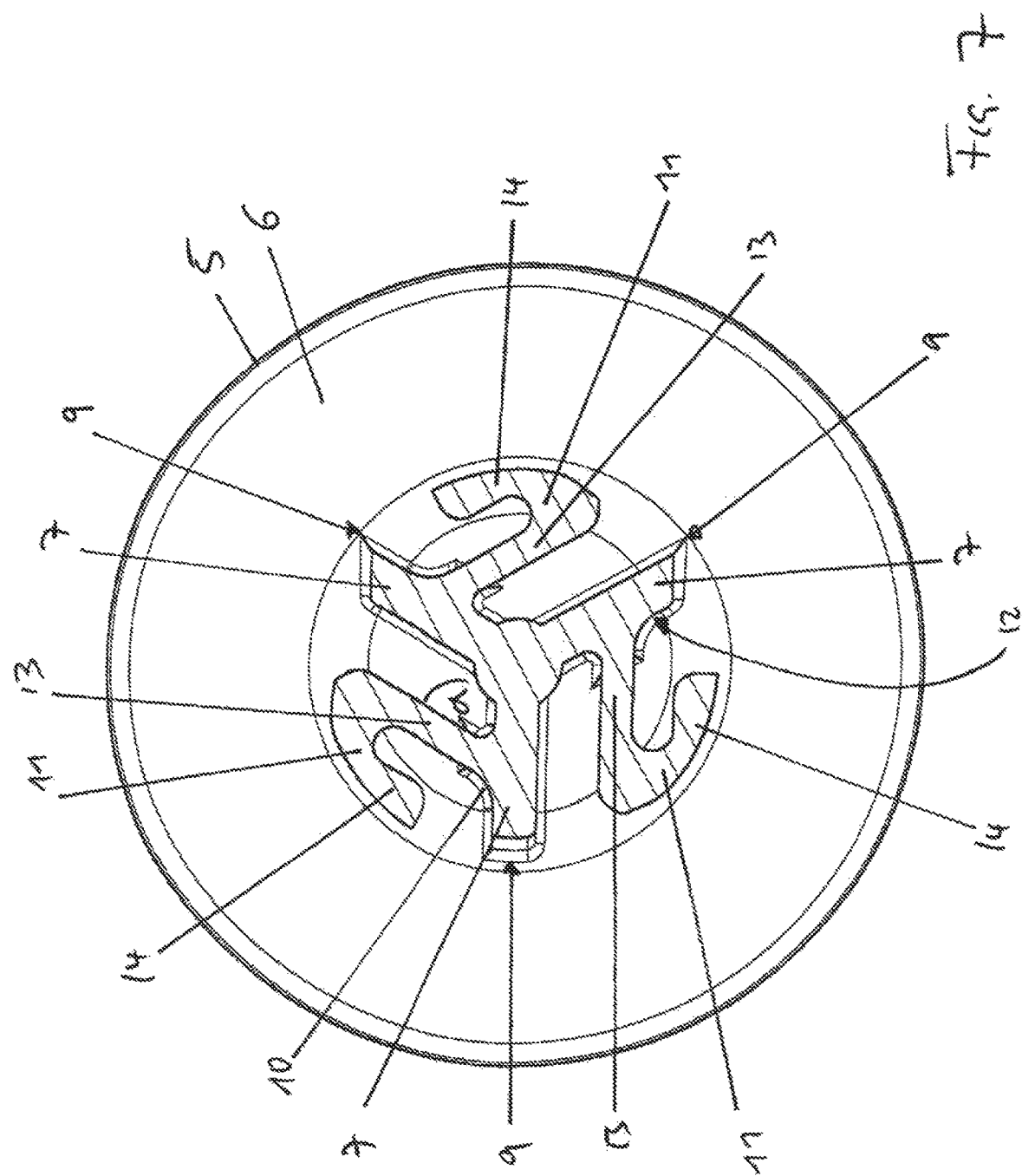

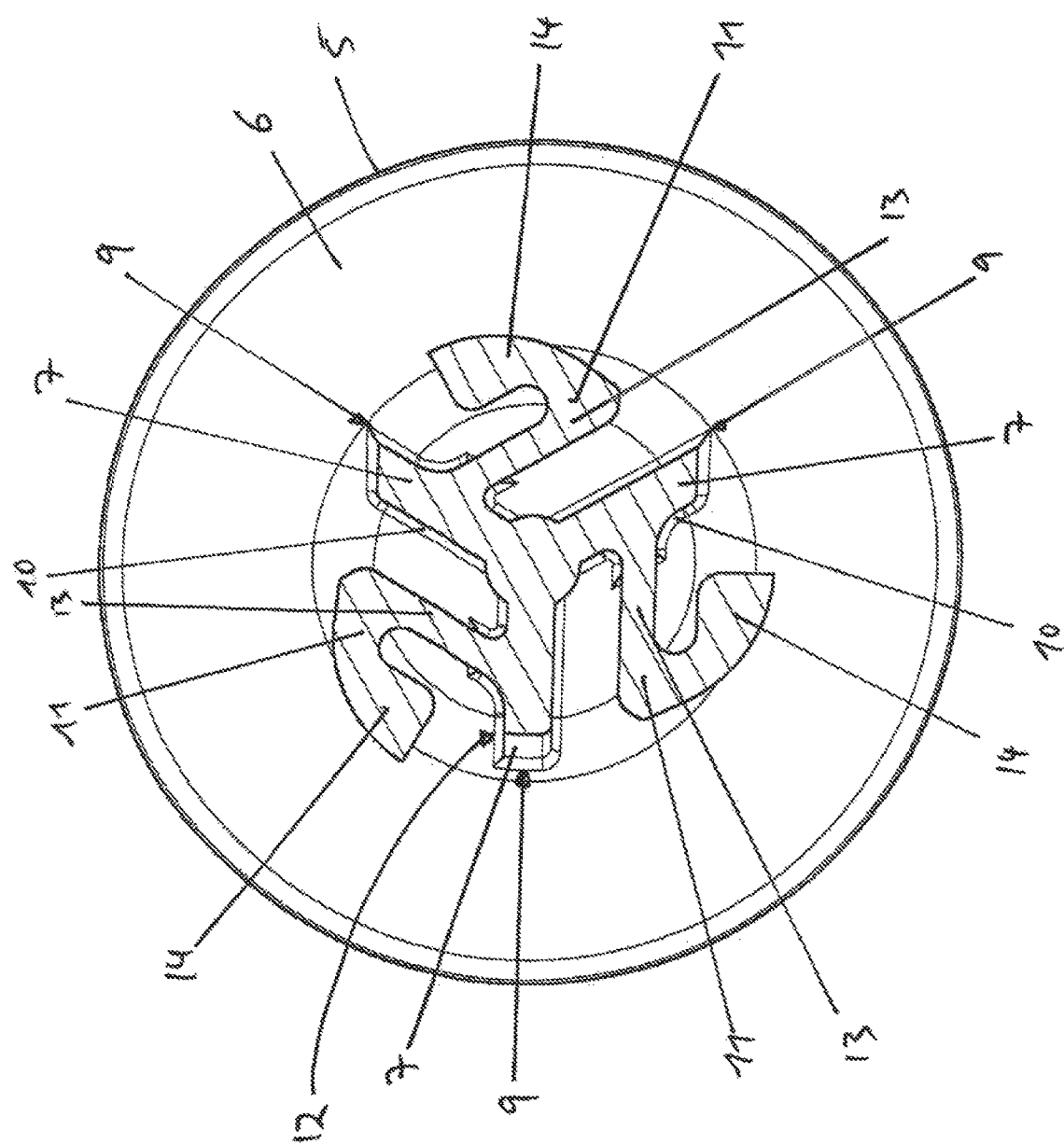

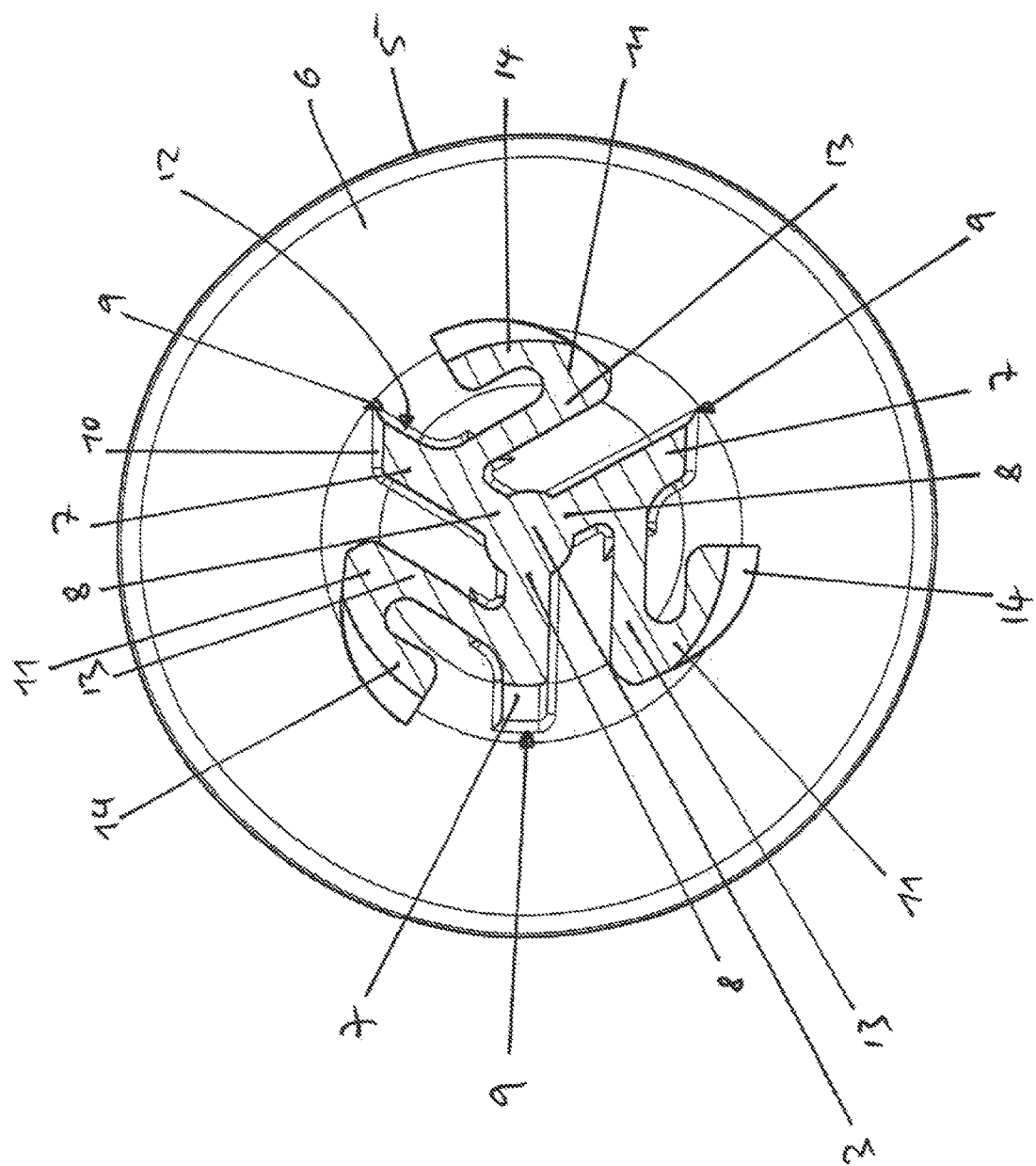

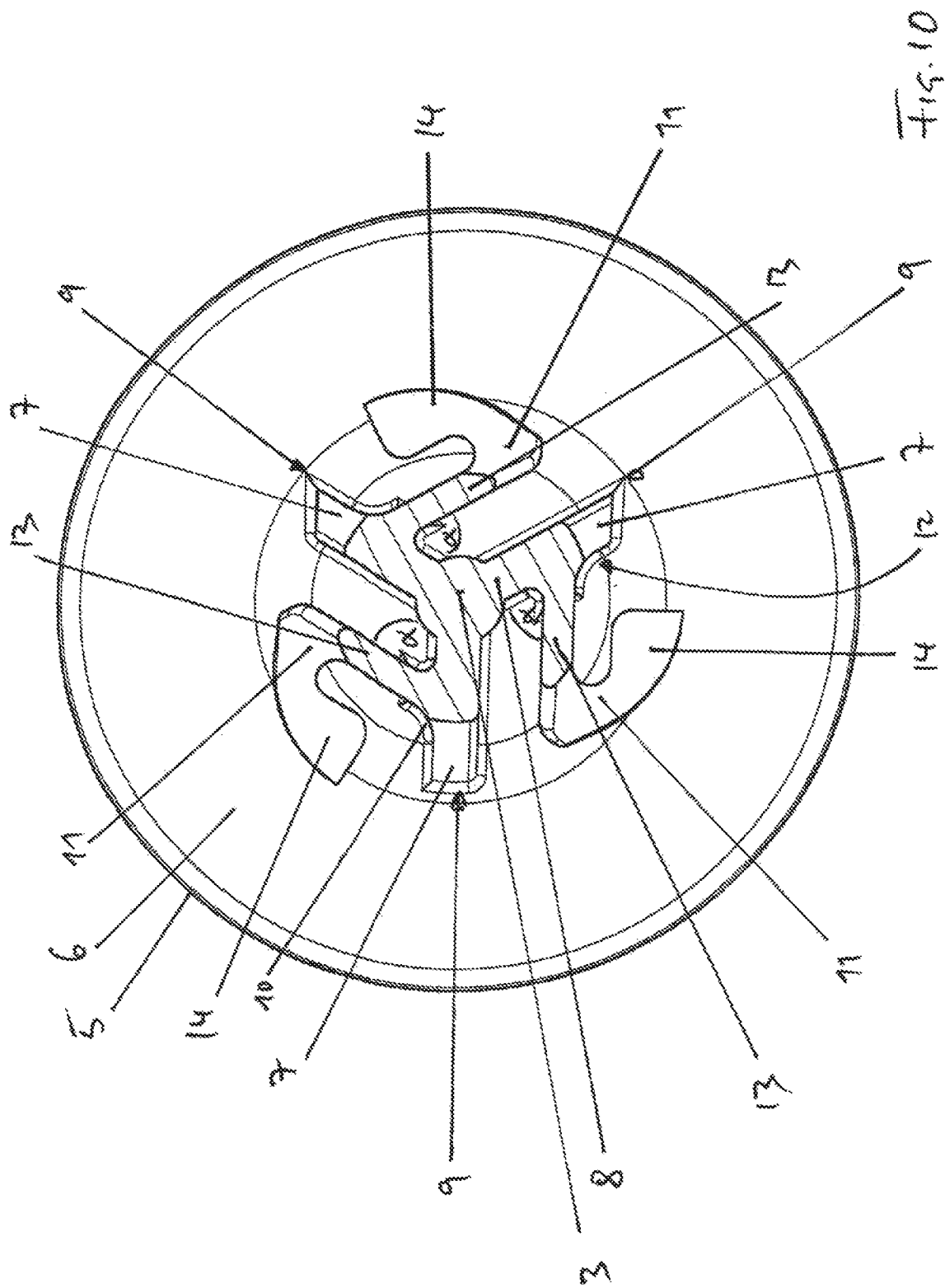

CLIP WITH A HEAD AND A SHANK EXTENDING FROM THE HEAD ALONG A LONGITUDINAL AXIS

TECHNICAL FIELD OF THE INVENTION

The invention relates to a clip with a head and a shank extending from the head along a longitudinal axis.

BACKGROUND OF THE INVENTION

From U.S. Pat. No. 7,967,539 B2, a clip with a head and with a shank extending along a longitudinal axis from the head is known, in which, in the representation of FIG. 2, six ribs are provided, wherein each rib extends from a base of the respective rib on the shank to an end of the respective rib radially with cutoff [sic] from the base of the respective rib. The collar 43 belonging to the head is connected via a cylindrical shank ("shank 48") to the rib-supporting part of the shank ("hub 4") (see FIG. 11).

BRIEF SUMMARY OF THE INVENTION

Against this backdrop, the underlying aim of the invention is to propose a clip which can be introduced easily into a fastening opening, which can reliably exert holding forces regardless of its respective position with regard to a rotation around its longitudinal axis and which, in addition, can be easily produced.

This aim is achieved by the subject matter of claim 1. Advantageous embodiments are reproduced in the dependent claims of the following description.

The inventive clip comprises a head and a shank extending from the head along a longitudinal axis, in which at least two ribs are provided, wherein each rib extends from a base of the respective rib on the shank to an end of the respective rib, radially spaced from the base of the respective rib. Here, the clip differs in its basic design from clips such as those known from EP 2 404 067 B1 and WO 2012/104250 A1, for example. In their shank area, clips such as those known from EP 2 404 067 B1 or WO 2012/104250 A1 have flat surfaces on at least two sides of the shank, but often on all four sides of a shank of rectangular design. These surfaces result from the fact that clips of this type are produced by bending metal stamped parts and thus consist mainly of flat construction sections. Due to the basic inventive design with at least 2 ribs which have a base on the shank and an end radially spaced from the base, the possibility is created for designing the sections of the clip to be introduced into the opening more freely with regard to their spatial arrangement.

The invention provides that at least one of the ribs has an elastic arm which protrudes from the respective rib. Here, the invention provides that at least one rib has a side which extends between the base of the rib and the end of the rib, wherein the elastic arm of this rib protrudes from this side of the rib. Here, the elastic arm is designed in such a manner that it has at least two sections, a first section and a second section. The first section is connected at one end to the rib and at its other end to the second section. The second section extends in a different direction from the first section.

Due to the arrangement of the elastic arm on a side of the rib, the advantage can be achieved that the arm is not provided at the end of the rib, where it can be damaged, for example, overextended, in an exposed position. The division of the elastic arm into two sections which extend in different directions provides the advantage that the second section can be designed as a clamping element which, when the shank of the clip is passed through a hole, jumps radially outward after passing through the hole, and, by engaging behind the margin of the hole, it prevents the clip from being pulled back, while the first section can be used to form the bridge between the rib and the desired positioning of the second section. The provision of the first section makes it possible, for example, to hold the second section in a position spaced from the rib and thus create space for the deflection of the second section, when the clip is introduced into the hole and when the second section has to be deflected for the passage of the shank through the hole. However, at the same time, as a result of the presence of the ribs, the clip has a more stable basic design which can prevent, for example, radial movements of the clip in the hole.

Due to the fact that the second section extends in a different direction from the first section, it becomes possible to increase the elasticity of the arm within its extent. Embodiments are conceivable in which the first arm has a stiffer design and the transition from the first arm to the second arm functions in the manner of an articulation, for example, a hinge, and therefore confers elasticity to the arm within its extent. Such an embodiment with increased elasticity in the transition from the first section to the second section can be used in order to reduce or prevent damage to the outer edge (an outer edge of the second section), so that the clip can be used repeatedly. This can also contribute to enabling the clip to be repeatedly removed (taken out repeatedly), without the pull-out force (which is necessary for removing the clip) being reduced, that is to say, in spite of repeated removal, the clip can still always exert the same barring action against a removal. As a result, the possibility is also provided for generating higher holding forces, wherein, at the same time, the arm remains capable of undergoing elastic deformation.

Furthermore, the invention provides that at least one of the ribs is connected at least in sections directly to the head, and that the first section is also connected at least in sections directly to the head. As a result, the stability of the shank as well as the positional accuracy with which the first section positions the second section of the elastic arm is increased. Furthermore, this results in a reduction of the risk that the elastic arm will be damaged, for example, break off, at its connection to the rib. Due to the fact that the rib is connected at least in sections directly to the head and the first section is also connected at least in sections directly to the head, the possibility of a relative movement of the first section relative to the rib is reduced, at least in the area in which the first section is connected to the rib, and thereby the likelihood of damage is reduced, which otherwise could occur during relative movements between the first section and the rib in the area of the connection between the first section and the rib.

A "clip" is understood to mean a fastening device which has at least a first contact surface and at least a second contact surface facing the first contact surface. The first contact surface is as a rule provided on a fixed element of the fastening device, usually on the head of the clip, while the second contact surface is provided on a springy element of the fastening device, such as the elastic arm. Such fastening devices are provided in order to be introduced by means of a tip into a recess, usually a hole, in a first element. In the process, the springy element bearing the second contact surface is pressed in during the insertion, but, after passing through the hole, it springs back into its starting position. The first element is designed usually as a flat element, for example, as a panel or as a metal plate of a part of a frame of a vehicle. However, the first element can also have a blind hole with an appropriately selected undercut, which enables the springing out of the springy element, after it has passed a narrower portion of the hole above the undercut. A second element can be fastened by clamping to the first element, for example, when it is shifted between a head of the clip and a surface of the first element, and the distance between the first contact surface which is then provided on the head of the clip and the second contact surface of the clip is selected so that it can generate such a clamping in the case of a certain material strength of the first element and a certain material strength of the second element. It is also conceivable that the second element as well has a hole and that the clip is introduced by means of its tip through the two holes. It is also conceivable that the second element is fastened on a head of the clip when the latter has, for example, a hook or a fastening plug, or when the second element is simply glued, welded or connected in another manner by joining to the head of the clip.

A head of such a clip is understood to mean a broadening provided at an end of the clip. As a rule, the head is provided in order to prevent that the clip can be moved entirely through a hole of the first element. Often the head is designed in order to be able to apply to the clip the force that is necessary for moving the clip into a hole of the first element. For this purpose, the clip often has a flat surface facing away from the tip. In a preferred embodiment, the head has a rigid design, wherein "rigid" is understood to mean that no section of the head is movable relative to another section of the head, for example, is designed with springiness. In an alternative embodiment, the head has a rigid base body on which springy elements belonging to the head, for example, springy arms or umbrella-like sealing lips, are provided. In a preferred embodiment, the largest cross-sectional area of all of the cross-sectional areas of the head in planes perpendicular to the longitudinal axis of the clip is greater than the largest cross-sectional area of all the cross-sectional areas of the shank in planes perpendicular to the longitudinal axis of the clip.

Furthermore, the clip preferably has a tip. In the context of this description, "tip" is understood to mean only the end of the clip opposite the head. In fact, in a preferred embodiment it is provided that a shank of the clip extending from the head in the direction of the tip narrows towards the tip. However, this is not absolutely necessary. Tip, in the context of this description, is also understood to mean a blunt end to be provided, in a conceivable embodiment, at the end of a shank opposite the head. In a preferred embodiment, the tip can taper in the shape of a pyramid or in the shape of a cone or in the shape of a truncated pyramid, or in the shape of a truncated cone. In the same way, the tip can be formed by the ridge of a roof-shaped end section of a shank extending from the head to the tip. However, this is not absolutely necessary. The tip can be formed by a single section of the clip.

Between the head and the tip, the clip has a shank consisting optionally of several parts. The clip has a longitudinal axis which extends from the head to the tip. Particularly preferably, the shank is longer in its longitudinal direction pointing from the head to the tip than in a width direction pointing perpendicularly to the longitudinal extent. Particularly preferably, the longitudinal axis of the clip points in the direction of the longitudinal extent of the shank. In descriptions of clips, the term "shank" is often used to describe all the components of the clip which are provided between the head and the tip of the clip. For the description of the present invention, the term "shank" should be understood to mean the portion of all of the components of the clip which are provided between the head and the tip of the clip, and which are not formed by the ribs. Particularly preferably, "shank" is understood to mean the material arranged centrally, particularly preferably the material of the clip arranged in the area of the longitudinal axis from which the ribs extend. If one (mentally) separates the ribs, then the shank can have for example the shape of a rod or of a pipe extending from the head to the tip.

In a preferred embodiment, the clip is designed to be mirror symmetric with respect to a plane which contains the longitudinal axis of the clip. In an alternative embodiment, the clip is designed to be rotationally symmetric around the longitudinal axis, so that each section of the clip, by a rotation by an angle around the longitudinal axis, can be brought in alignment with an identically designed section of the clip. In the case of 2 ribs, the angle is particularly preferably 180°, in the case of 3 ribs, it is particularly preferably 120° and, in the case of 4 ribs, it is particularly preferably 90°, and, in the case of n ribs it is particularly preferably 360°/n. However, embodiments are also conceivable in which the clip is designed to be non-mirror symmetric and/or non-rotationally symmetric. This can result from the installation situation, for example, when the clip is designed to be introduced into a non-rotationally symmetric hole or when the clip is to be introduced into an elongate hole, or when, by designing the rib or the arms in a mutually different form, particular technical effects are to be achieved such as, for example, the possibility of being able to pull the clip more easily out of the hole by tipping it slightly, and one of the ribs is designed to be shorter for the provision of the possibility of an easy tilting.

In a preferred embodiment, the head has an end face, particularly preferably a flat end face or an umbrella-like end face, wherein the shank is connected on its head-side end to the end face and protrudes from the end face along the longitudinal axis, preferably at an angle of 90°.

The cross-sectional shape of the shank in planes perpendicular to the longitudinal axis can preferably be rectangular, particularly preferably square, polygonal, round or elliptical. In a preferred embodiment, the cross-sectional shape over the longitudinal extent of the shank is preferably unchanging. Embodiments are conceivable in which also the size of the cross-section of the shank does not change over its longitudinal extent. However, in a preferred embodiment, the shank, with regard to the size of its cross section, is designed to taper towards the tip while maintaining its cross-sectional shape. The course of the cross-sectional shape or cross-sectional size of the shank over its longitudinal extent in planes perpendicular to the longitudinal axis can also be described in that the cross-sectional shape or cross-sectional size is viewed in all planes perpendicular to the longitudinal axis that intersect the shank. In a preferred embodiment, in at least half of the planes that are perpendicular to the longitudinal axis, particularly preferably in 75% of the planes that are perpendicular to the longitudinal axis, the shank has a cross section which does not change with regard to its geometric shape and, particularly preferably, a cross section which does not change with regard to its size. The shank can be made of a solid material, that is to say, in the mentioned cross sections, its cross section is completely filled with material. In the same way, in order to save material, it is also possible that the shank has a recess or cavity oriented coaxially with the longitudinal axis, and thus the shank is designed in the form of a pipe, for example. In a preferred embodiment, the center of the above-mentioned cross sections lies on the longitudinal axis.

According to the invention, it is provided that each rib has a base on the shank. This means that each rib is connected to the shank and protrudes from the shank. Since the ribs have a material thickness which, due to the transition of the rib into the shank, can make it difficult to determine the cross-sectional shape of the shank, in the course of this description, cross section of the shank in a plane perpendicular to the longitudinal axis is understood to mean the geometric shape that results when the ribs are separated from the shank along a respective separation plane which extends parallel to the longitudinal axis.

The clip according to the invention has at least two ribs. In a particularly preferred embodiment, the clip has three ribs, particularly preferably four ribs, particularly preferably more than four ribs. A rib is understood to mean a sub-element of the clip which extends from a base on the shank of a clip to an end which is radially spaced from the base. Here, the description "radial spacing" is understood to mean that the end of the respective rib is on a circle around the longitudinal axis, the radius of the circle being greater than a circle on which the base of the respective rib lies. In order to achieve the advantages of the invention, it is not necessary for the rib to extend radially, even if this is preferred. Embodiments in which the rib extends from the base at an angle relative to the radial direction up to the end of the rib are also conceivable.

The distance between the base of the respective rib and the end of the respective rib can be different in two planes which are perpendicular to the longitudinal axis and which each intersect the rib. The end of the rib thus does not have to be formed by a plane or a line which lies in a plane perpendicular to the longitudinal axis. Thus, for example, it is conceivable that the rib tapers towards the tip, which is equivalent to saying that, in the cross sections of the rib which are perpendicular to the longitudinal axis, in the cross sections which are closer to the tip, the distance between the ends of the rib and the base of the rib is smaller, compared to cross sections which are farther from the tip.

In a preferred embodiment, the maximum distance, which the end of a rib with respect to the base of the rib in a cross section of the rib, which are perpendicular to the longitudinal axis, is greater than the thickness of the rib, wherein, thickness of the rib is understood to mean the dimension of the rib which, in a plane perpendicular to the longitudinal axis, extends perpendicularly to the direction leading from the base of the rib to the end of the rib.

In a preferred embodiment, the maximum distance, which the end of a rib with respect to the base of a rib in a cross section of the rib, which are perpendicular to the longitudinal axis, is arranged closer to the head than to the tip and, particularly preferably, it is arranged at the head.

In a preferred embodiment, the rib has a plate-like design, wherein plate-like design is understood to mean in particular a design which has two side surfaces extending in planes arranged parallel with respect to one another. Particularly preferably, the side surfaces arranged in parallel planes extend from the base of the rib to the end of the rib. Particularly preferably, the rib has a central plane which contains the longitudinal axis, wherein the side surfaces extending in parallel planes have the same distance from the central plane. However, a rib designed as plate-like can also be designed so that it has two side surfaces extending in planes, wherein the side surfaces do not intersect, and the planes in which they extend form an angle with respect to one another of <20°, particularly preferably <15°, particularly preferably <10° and most particularly preferably <5°. The side surfaces of such an embodiment are preferably designed so that they taper slightly outward, so that the thickness of the plate-like rib is greater at the base than at the outer end of the rib. Here, the end of the rib can be formed by the radially outermost section of a flat surface which extends at an angle with respect to the side surfaces extending in parallel planes, preferably at an angle between 45° and 135°, particularly preferably at an angle of 90°. The end of the rib can also be formed by the ridge of a roof-like end section of the rib, which adjoins the side surfaces at the radially outer end. The end of the rib can also be the crown of an arcuate or spherical surface, which adjoins the side surfaces on the radially outer end.

At least one rib is connected at least in sections directly to the head. Particularly preferably, the rib is connected over half and particularly preferably more than half of its extent from the base to the end in the area of the head directly to the head. Particularly preferably, in the area of the head, the section of the rib adjoining the shank is connected directly to the head. Most particularly preferably, half of the ribs present and particularly preferably more than half of the ribs present are connected at least in sections directly to the head. Particularly preferably, all the ribs are connected at least in sections directly to the head. A direct connection of the rib to the head results from the fact that the rib, in the section in question, is connected to a portion of the head, for example, to the end face of the head. This can occur as a result of the fact that, in this section, the rib is glued to the head or it is connected to the head by means of the welding or another joining method. If the clip is elaborated from solid material, then a direct connection of the rib to the head can be achieved in that, in the section in which the rib should remain connected directly to the head, no material is removed or carved out. If the clip is cast by means of the casting method, then the direct connection of the rib to the head can be achieved in that, in this section, no core which would prevent the flow of material is provided. A rib is then not connected directly to the head when the rib, as in FIG. 11 of U.S. Pat. No. 7,967,539 B2, is not in contact with the end face of the head, and the shank is designed so it is designed as free-standing in this area.

The invention provides that at least one rib has an elastic arm which protrudes from the respective rib. An elastic arm is understood to mean in particular an arm which has a contact surface or a contact point, the position of which, as a result of application of a force at this contact point or at this contact surface, can be moved from a preferential position, which this contact point or this contact surface assumes without application of a force, to a second position, without the elastic arm being destroyed in the process. In a preferred embodiment, half of the ribs present have an elastic arm. Particularly preferably, more than half of the ribs present have an elastic arm. Most particularly preferably, all the ribs present have an elastic arm.

The invention provides that at least one rib has a side which extends between the base of the rib and the end of the rib, wherein the elastic arm of this rib protrudes from this side of the rib. In a preferred embodiment, half of the ribs present have a side which extends between the base of the rib and the end of the rib, wherein the elastic arm of this rib protrudes from this side of the rib. Particularly preferably, more than half of the ribs present have a side which extends between the base of the rib and the end of the rib, wherein the elastic arm of this rib protrudes from this side of the rib. Most particularly preferably, all the ribs present have a side which extends between the base of the rib and the end of the rib, wherein the elastic arm of this rib protrudes from this side of the rib. Side of the rib is understood to mean a surface of the rib, particularly preferably a flat surface (a surface arranged in a plane) of the rib, of which the surface normal points not in the direction from the base of the rib to the end of the rib but rather in a direction parallel to the direction which points from the base of the rib to the end of the rib. In a preferred embodiment, the side of the rib is a flat surface, of which the surface normal extends at an angle of 90° relative to the direction which points from the base of the rib to the plane of the towards the end of the rib.

The invention provides that at least one elastic arm has a first section and a second section, wherein the first section is connected at one end to the rib and at another end to the second section, wherein the second section extends in a different direction from the first section. In a preferred embodiment, half of the elastic arms present have the above-described structure consisting of a first section and of a second section, in which the first section is connected at one end to the rib and at another end to the second section, wherein the second section extends in a different direction from the first section. In particular, more than half of the elastic arms present have the above-described structure consisting of a first section and of a second section, in which the first section is connected at one end to the rib and at another end to the second section, wherein the second section extends in a different direction from the first section. Most particularly preferably, all the elastic arms present have the above-described structure consisting of a first section and a second section, wherein the first section is connected at one end to the rib and at another end to the second section, wherein the second section extends in a different direction from the first section.

In a preferred embodiment, the first section is a plate-like element, wherein plate-like design is understood to mean in particular a design which has two side surfaces extending in planes arranged parallel with respect to one another. Particularly preferably, the side surfaces arranged in parallel planes extend from the connection of the first section of the elastic arm to the rib to the transition of the first section into the second section. Particularly preferably, the first section has a central plane, wherein the side surfaces extending in parallel planes have the same distance from the central plane. In a preferred embodiment, the central plane extends parallel to the longitudinal axis. In a preferred embodiment, the central plane of the first section of an elastic arm of a rib extends parallel to the central plane of an adjacent rib of plate-like design. A first section of plate-like design can also be designed so that it has two side surfaces extending in planes, wherein the side surfaces do not intersect, and the planes in which they extend are at an angle with respect to one another of <20°, particularly preferably <15°, particularly preferably <10° and most particularly preferably <5°. The side surfaces of such an embodiment are preferably designed so as to taper slightly outward, so that the thickness of the first section at the connection to the rib is greater than at the transition of the first section into the second section. In an embodiment with a central plane, the direction in which the first section extends is understood to mean the direction which lies in the central plane and extends in a plane perpendicular to the longitudinal axis of the shank. In a preferred embodiment, the first section extends at an angle of more than 45° relative to the surface of the side from which the elastic arm protrudes. In a preferred embodiment, the first section extends at an angle between 45° and 90°, including 45° and 90°, relative to the surface of the side from which the elastic arm protrudes. In a preferred embodiment, the first section extends at an angle between 45° and 90°, including 45° but excluding 90°, relative to the surface of the side from which the elastic arm protrudes. The angle in combination with the site at which the first section, viewed in radial extension of the rib, is arranged on the rib has an effect on the position of the transition from the first section to the second section. In order to enable a satisfactory deflection of the second section, it is recommended to select the angle enclosed between the first section and the rib to be smaller the farther the site on which the first section, viewed in radial extension of the rib, is arranged on the rib is spaced from the base of the rib.

In a preferred embodiment, the site at which the first section, viewed in radial extension of the rib, is arranged on the rib is spaced from the base over 30%, preferably over 50% of the extent of the rib from the base to its radially outer end. The site at which the first section, viewed in radial extension of the rib, is arranged in the last third of the rib before its radially outer end is particularly preferred.

In a preferred embodiment of the invention, the second section is a plate-like element, wherein plate-like design is understood to mean in particular a design which has two side surfaces extending in planes arranged parallel to one another. Particularly preferably, the side surfaces arranged in parallel planes extend from the connection of the second section of the elastic arm to the first section to a free end of the second section. Particularly preferably, the second section has a central plane, wherein the side surfaces extending in parallel planes are at the same distance from the central plane. In a preferred embodiment, the central plane extends at an angle with respect to the longitudinal axis, preferably at an angle of <45°, particularly preferably <20° and most particularly preferably <10°. However, a second section of plate-like design can also be designed so that it has two side surfaces extending in planes, wherein the side surfaces do not intersect, and the planes in which they extend form an angle with respect to one another of <20°, particularly preferably <15°, particularly preferably <10° and most particularly preferably <5°. The side surfaces of such an embodiment are preferably designed so as to taper slightly outward, so that the thickness of the second section at the connection to the first section is greater than at the free end of the second section. In an embodiment with central plane, the direction in which the second section extends is understood to mean the direction which lies in the central plane and extends in a plane perpendicular to the longitudinal axis of the shank.

However, embodiments are also conceivable in which the second section is not designed to be plate-like, but instead has bulging sections, for example. In such an embodiment, the direction in which the $2^{nd}$ section extends in combination with a plate-like first section is understood to mean the direction in which the elastic arm no longer extends in the direction which lies in the central plane and extends in a plane perpendicular to the longitudinal axis of the shank. In the case of a first section of plate-like design, the second section accordingly starts in particular at the site where the first section no longer extends in the direction which lies in the central plane and extends in a plane perpendicular to the longitudinal axis of the shank.

The invention provides that the second section extends in a different direction from the first section. In a preferred embodiment, the second section extends in an opposite direction, so that between the first section and the second section an angle of <90°, particularly preferably of <75°, particularly less than 60° is enclosed, for example, an angle of 45°.

The invention provides that the first section is connected at its other end to the second section. Particularly preferably, this connection is an elastic connection which enables a destruction-free positional change of the second section relative to the first section when external forces act on the second section.

The invention provides that the first section is connected at least in sections directly to the head. Particularly preferably, the first section is connected to the head over half and preferably over more than half of its extent from the connection to the rib to the transition to the second section in the area of the head. Particularly preferably, the first section is connected to the head over less than half of its extent from the connection to the rib to the transition to the second section in the area of the head, and connected to the head particularly preferably over less than 30%, most particularly preferably over less than 15% and particularly preferably over less than 10% of its extent from the connection to the rib to the transition to the second section in the area of the head, said first section, however, at the same time being connected to the head particularly preferably over more than 5% of its extent from the connection to the rib to the transition to the second section in the area of the head. Particularly preferably, the section of the first section, which adjoins the rib, is connected directly to the head in the area of the head. Most particularly preferably, half and particularly preferably more than half of the elastic arms of the first section that are present are connected at least in sections directly to the head. Particularly preferably, in all the elastic arms, the first section is connected at least in sections directly to the head. A direct connection of the first section to the head results from the fact that the first section is connected in the section in question to a portion of the head, for example to the end face of the head. This can occur as a result of the fact that, in this section, the first section is glued to the head or connected by welding or by another joining method to the head. If the clip is elaborated from solid material, then a direct connection of the first section to the head can be achieved in that, in the section in which the first section should remain connected directly to the head, no material is removed or carved out. If the clip is cast by means of a casting method, then the direct connection of the first section to the head can be achieved in that, in this section, no core which would prevent the flow of material is provided.

In a preferred embodiment, a rib is connected to an elastic arm via the portion of its extent from the base to the branching off of the end of the elastic arm in the area of the head directly to the head.

In a preferred embodiment, the maximum radial extension of a first rib between the base of the first rib and the end of the first rib is different from the maximum radial extension of a second rib between the base of the second rib and the end of the second rib. Thus, embodiments are conceivable in which one rib is shorter than the other rib, respectively than the other ribs. Such an embodiment can offer advantages for the case in which the clip is to be pulled out of the hole. If one of the ribs is designed to be shorter, then it is conceivable that the clip can be tilted with regard to the orientation of its longitudinal axis with respect to the hole so that the shorter rib arrives in the area of the hole more easily and thus a pulling out of the clip can be started more easily. In a preferred embodiment of the invention, at least three ribs are provided, wherein for all the ribs except for one, the maximum radial distance between the base of the respective rib and the end of the respective rib is the same, wherein for one rib the maximum distance between the base of the rib and the end of the rib is different from the maximum radial distance between the base and the other rib and the respective ends of the other ribs.

In a preferred embodiment, the ribs of the clip have a stiff design. This is understood to mean that the position of the rib can be changed by force application only with partial destruction of the rib. If the ribs have a stiff design, this has advantages for the fixing of the position of the clip in the hole. The ends of the ribs define an envelope. If the hole into which the shank of the clip with the ribs is introduced is exactly as large as or only slightly larger than this envelope, then the position of the shank of the clip in the hole is fixed. The clip cannot float in the hole and—depending on the size excess of the hole relative to the envelope formed by the ends of the ribs—it has only slight play.

In a preferred embodiment it is provided that the length of at least one rib in a direction parallel to the longitudinal axis of the shank is the same as the extent of the shank in the direction of the longitudinal axis. Particularly preferably, in half of the ribs present, the length in a direction parallel to the longitudinal axis of the shank is the same as the extent of the shank in the direction of the longitudinal axis. Particularly preferably, in more than half of the ribs present, the length in a direction parallel to the longitudinal axis of the shank is the same as the extent of the shank in the direction of the longitudinal axis. Particularly preferably, in all the ribs present, the length in a direction parallel to the longitudinal axis of the shank is the same as the extent of the shank in the direction of the longitudinal axis. In a preferred embodiment, no free-standing sections of the shank are thus provided. The ribs which have the same extent in a direction parallel to the longitudinal axis of the shank as the extent of the shank in the longitudinal direction, the ribs, viewed over the extent of the rib, must not have the same distance between the base and the end of the rib. In a preferred embodiment, at least one rib tapers in the direction of the end of the shank. Thereby the formation of a tip at the end of the shank is promoted, and the introduction of the shank into a hole can be made easier. Particularly preferably, in half of the ribs present, the length in a direction parallel to the longitudinal axis of the shank is the same as the extent of the shank in the direction of the longitudinal axis. Particularly preferably, half of the ribs present taper in the direction of the end of the shank. Particularly preferably, more than half of the ribs present taper in the direction of the end of the shank. Particularly preferably, all the ribs present taper in the direction of the end of the shank.

In a preferred embodiment, it is provided that the elastic arm does not have the same (maximum) extent in a direction parallel to the longitudinal axis as the rib. In most of the application cases of the inventive clip, the elastic arm is used for providing the second contact surface which faces the first contact surface usually provided on the head. Thus, for the design of the elastic arm, it is above all the area of the elastic arm which is closer to the head than to the tip that is essential. Therefore, embodiments are conceivable in which material is saved by the fact that the elastic arm is designed in a direction parallel to the longitudinal direction of the shank so as not to be as long as the rib from which it protrudes. In a preferred embodiment, the maximum length of the first section of the elastic arm in a direction parallel to the longitudinal axis of the shank is connected at the end of the first section, which is connected to the rib, is smaller than the maximum length of the rib in a direction parallel to the longitudinal axis. In a preferred embodiment, at the end of the first section which is connected to the rib, the length of the first section of the elastic arm in a direction parallel to the longitudinal axis is less than 90% and particularly preferably less than 80% of the length of the rib in a direction parallel to the longitudinal direction.

In a preferred embodiment, the extent of the second section of the elastic arm in the direction parallel to the longitudinal axis is smaller on the portion which is connected to the first section than in a portion of the second section located further along the extent of the second portion from the first portion. Thus, embodiments are conceivable in which the connection between the second section and the first section of the elastic arm represents a narrowing, and the second section of the elastic arm, with regard to its extent in a direction parallel to the longitudinal axis of the shank, broadens starting from this narrowing. The provision of a narrowing between the first section and the second section can increase the flexibility. Thus, in these designs, the first section can be designed to be slightly stiffer, and, by the provision of a narrowing, the mobility of the second section relative to the first section can be increased.

In the preferred embodiment, the second section has a bulging portion designed to bulge outward. This bulging portion can particularly preferably form a second contact surface which is provided for coming in contact with the material surrounding a hole through which the shank is guided. When the shank is introduced into the hole, the bulging portion is deflected from a preferential position inward (in the direction of the shank), wherein the bulging part, as soon as it has passed the hole, is deflected outward again and in this position it prevents a pulling back of the shank.

In a preferred embodiment, the bulging portion has an edge which represents the transition of the peripheral surface of the bulging portion into a surface of the second section facing the head. In the installed state, the bulging portion engages behind the material surrounding the hole, wherein, in this preferred embodiment, a section of the surface facing the head can come in contact with the material.

In the preferred embodiment, the clip is designed as a single part. In a particularly preferred embodiment, the clip is produced from a plastic. Particularly preferably, the clip is produced by means of the injection molding method.

The inventive clip is used particularly preferably for fastening an element (the second element) to a body portion (the first element) of a vehicle, particularly preferably to the frame of a vehicle. Particularly preferably, the clip is used for fastening a panel (second element) to the frame of a vehicle (first element). Particularly preferably, the clip is used for fastening an airbag to a body portion, particularly preferably to a frame of a vehicle.

A device according to the invention comprises a first element and a second element fastened to the first element, wherein the first element has a hole, and the second element is fastened by means of an inventive clip to the first element, wherein the clip engages through the hole in such a manner that the head of the clip is arranged on one side of the first element and the tip of the clip is arranged on the opposite side of the element. In a preferred embodiment, the clip engages through the hole in such a manner that the head of the clip is arranged on one side of the first element and a contact surface is arranged on the shank of the clip on the opposite side of the element. In a preferred embodiment, the first element is a portion of the body of a vehicle, preferably a frame of a vehicle. In a preferred embodiment, the second element is a panel or an airbag.

BRIEF DESCRIPTION OF THE SEVERAL VIEWS OF THE DRAWINGS

Below, the invention is explained in greater detail in reference to a drawing which merely represents one embodiment example. In the drawing:

FIG. 6 shows the view of FIG. 1 with planes of section C, D, E and F drawn in, FIG. 7 shows a cutaway view of the clip according to FIGS. 1 to 3 in a horizontal section in plane of section C according to FIG. 6

FIG. 8 shows a cutaway view of the clip according to FIGS. 1 to 3 in a horizontal section in plane of section D according to FIG. 6

FIG. 9 shows a cutaway view of the clip according to FIGS. 1 to 3 in a horizontal section in plane of section E according to FIG. 6, and FIG. 10 shows a cutaway view of the clip according to FIGS. 1 to 3 in a horizontal section in plane of section F according to FIG. 6.

DETAILED DESCRIPTION OF THE INVENTION

Figure 1:
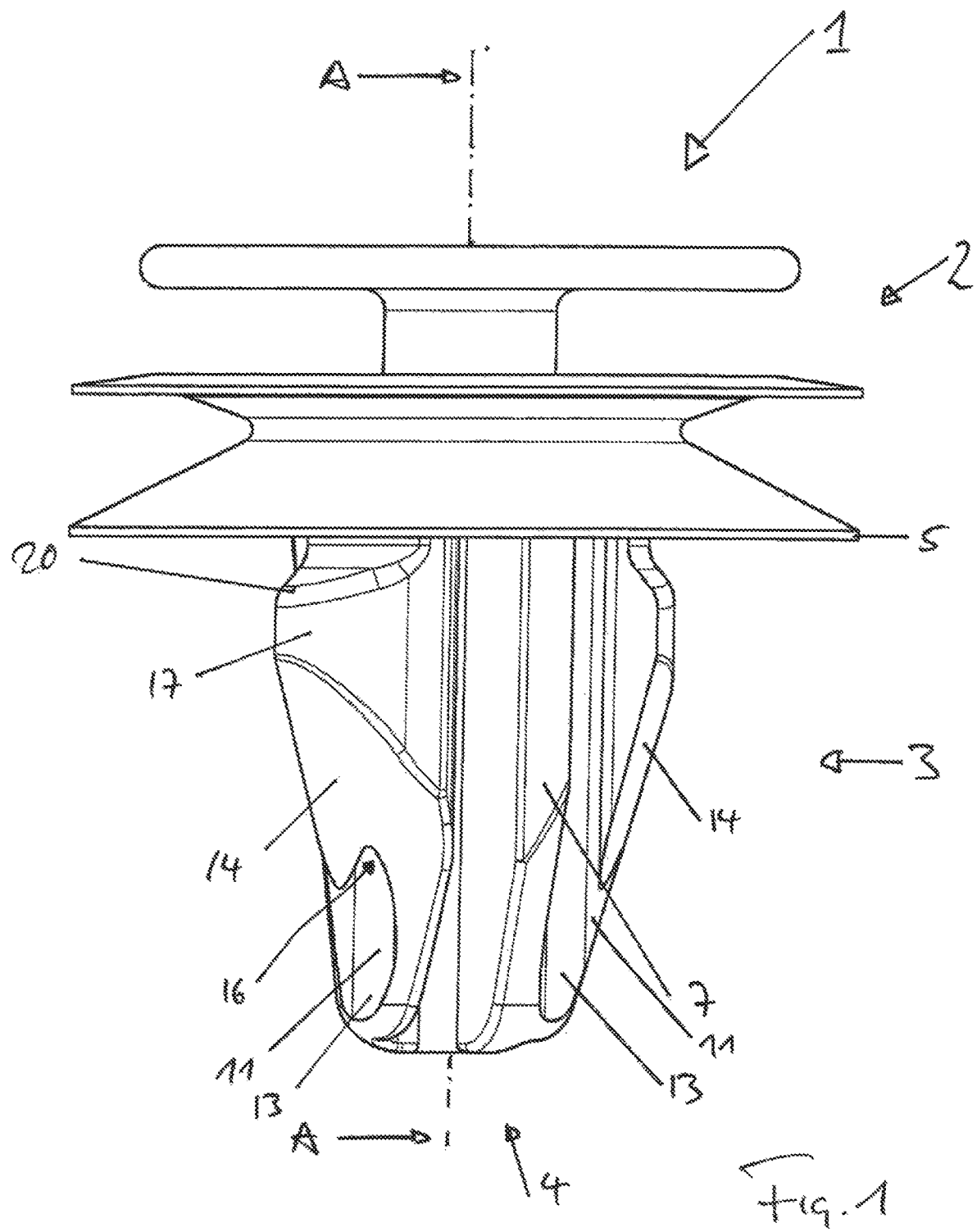
FIG. 1 shows an inventive clip in a side view.

The inventive clip 1 comprises a head 2 and a shank 3 extending from the head along a longitudinal axis B. At the end of the shank, a tip 4 of the clip 1 is formed. The head 2 of the clip 1 is the broadening provided at the upper end of the clip 1, which comprises the section 5 with an umbrella-like design, among others. The surface of the umbrella-like protrusion 5 facing the shank 3 forms the end face 6 of the head 2, which has an umbrella-like design. The shank 3 is connected to the horizontally running portion of this end face 6.

Figure 2:
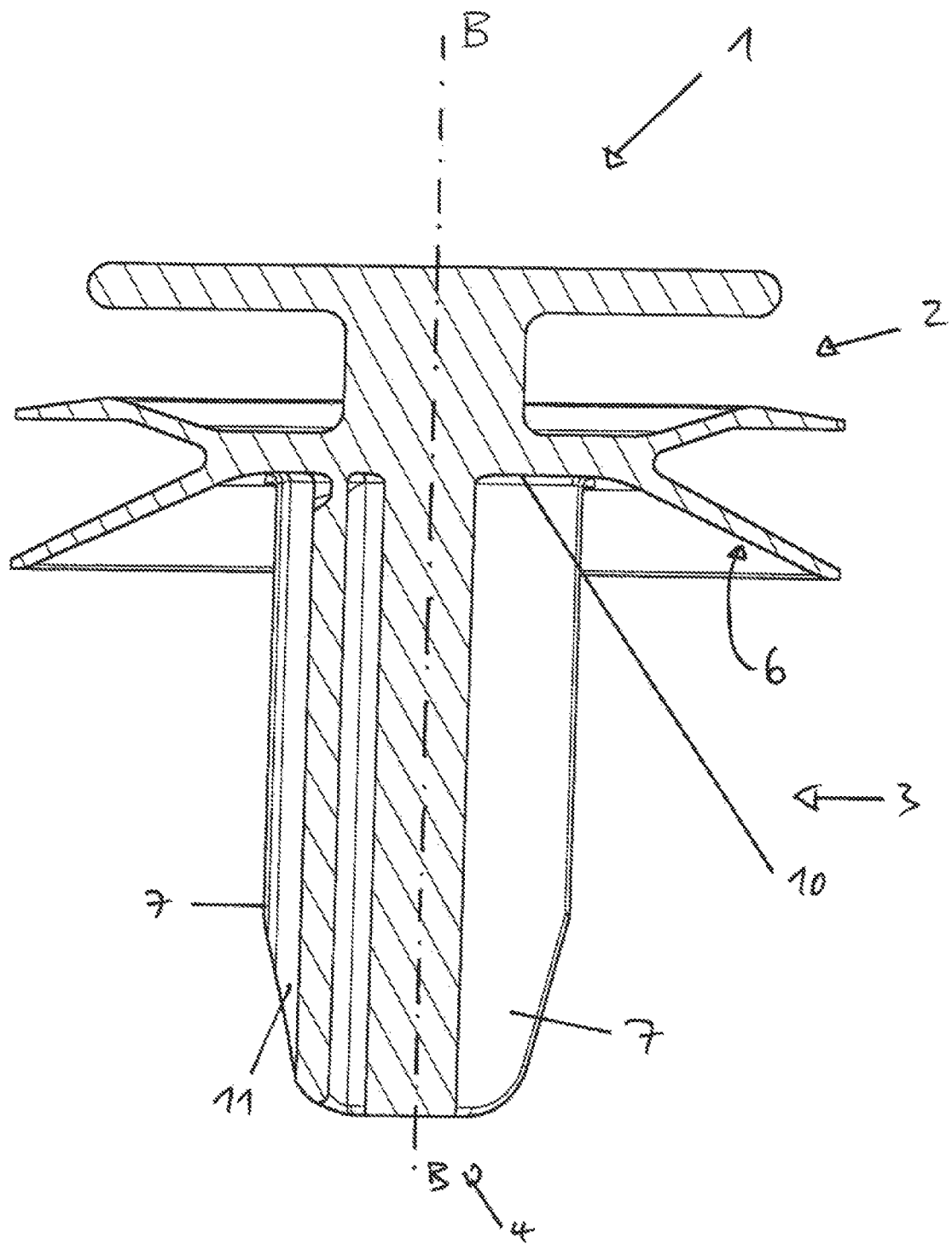
FIG. 2 shows a cutaway side view of the inventive clip represented in FIG. 1 along line A-A in FIG. 1.
Figure 3:
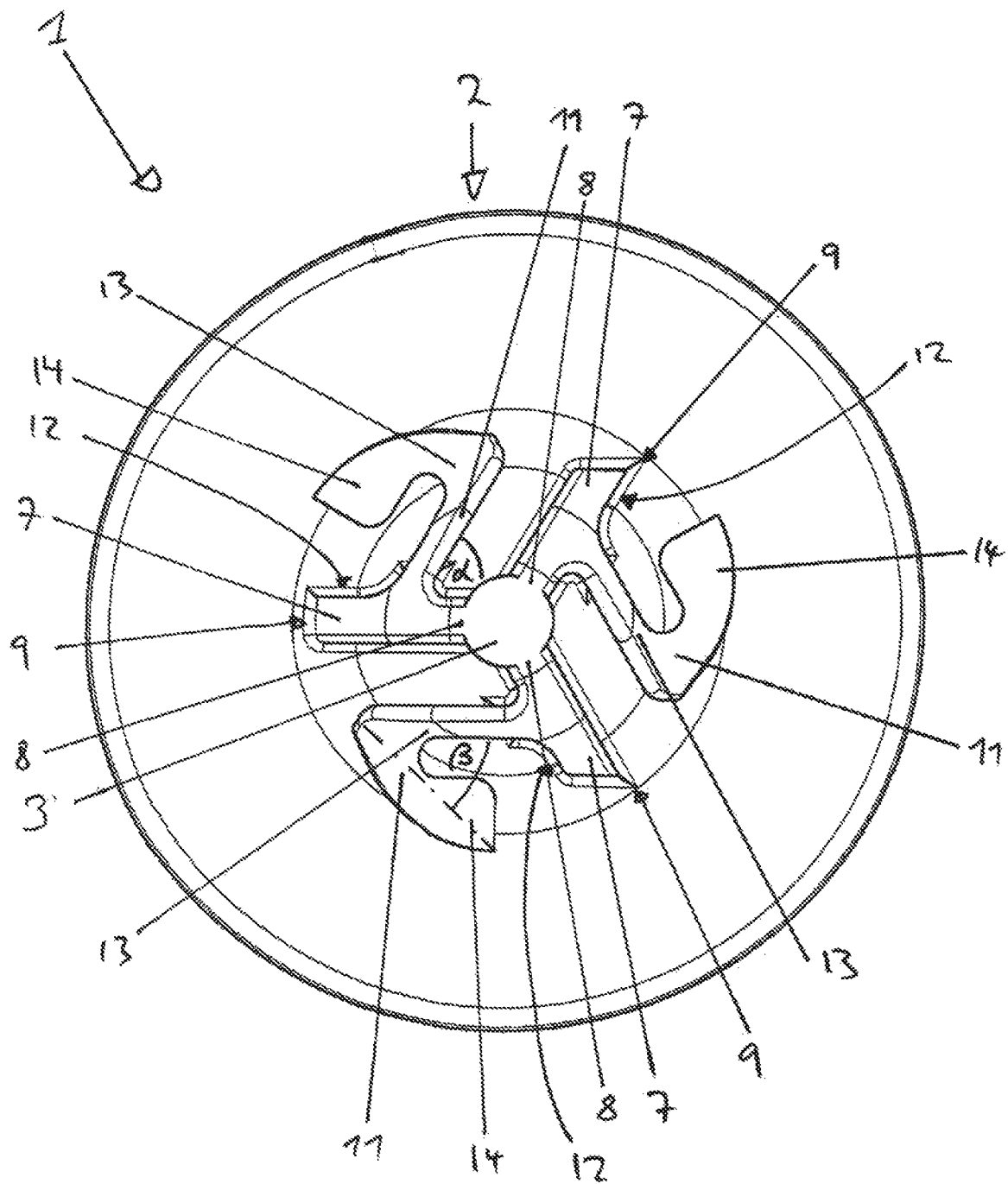
FIG. 3 shows a view of the inventive clip from below.

In the embodiment represented in FIG. 1 to FIG. 3, the clip 1 has three ribs 7. Each rib 7 extends from a base 8 of the respective rib on the shank 3 to an end 9 of the respective rib 7. The end 9 of the respective rib 7 is arranged with radial spacing from the base 8 of the respective rib 7.

As can be seen particularly in FIG. 2, each of the ribs 7 is connected directly to the head and, in particular, in the embodiment represented in the figures, over the entire radial extension of the rib 7 on the head. For this purpose, the material of the rib 7 is in an edge 10 formed between the rib 7 and the horizontal portion of the end face 6 directly into the horizontal portion of the end face 6.

In the embodiment represented in the figures, each rib 7 has an elastic arm 11 which protrudes from the respective rib 7. In the embodiment represented in the figures, each rib 7 has a side 12 which extends between the base 8 of the rib 7 and the end 9 of the rib 7. The elastic arm 11 of this rib 7 protrudes from this side 12 of the rib 7.

In the embodiment represented in the figures, each elastic arm has a first section 13 and a second section 14. The first section 13 is connected at one end to the rib 7. At its other end, the first section 13 is connected to the second section 14, wherein the second section 14 extends in a different direction from the section 13.

Figure 4:
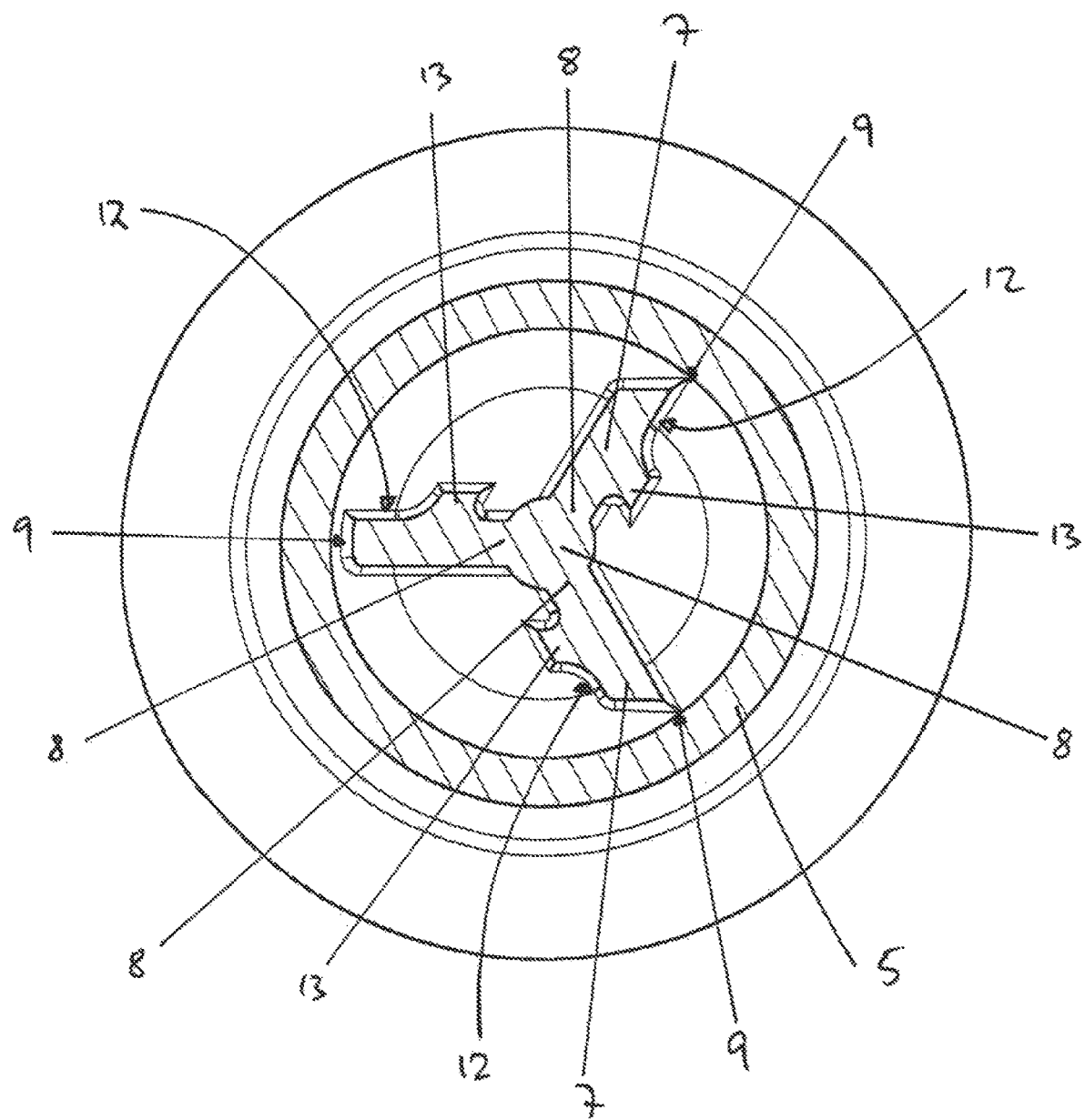
FIG. 4 shows a cutaway view of the clip according to FIGS. 1 to 3 in a horizontal section for the representation according to FIG. 1, wherein the plane of section was selected to be just below the transition from the end face into the rib.
Figure 5:
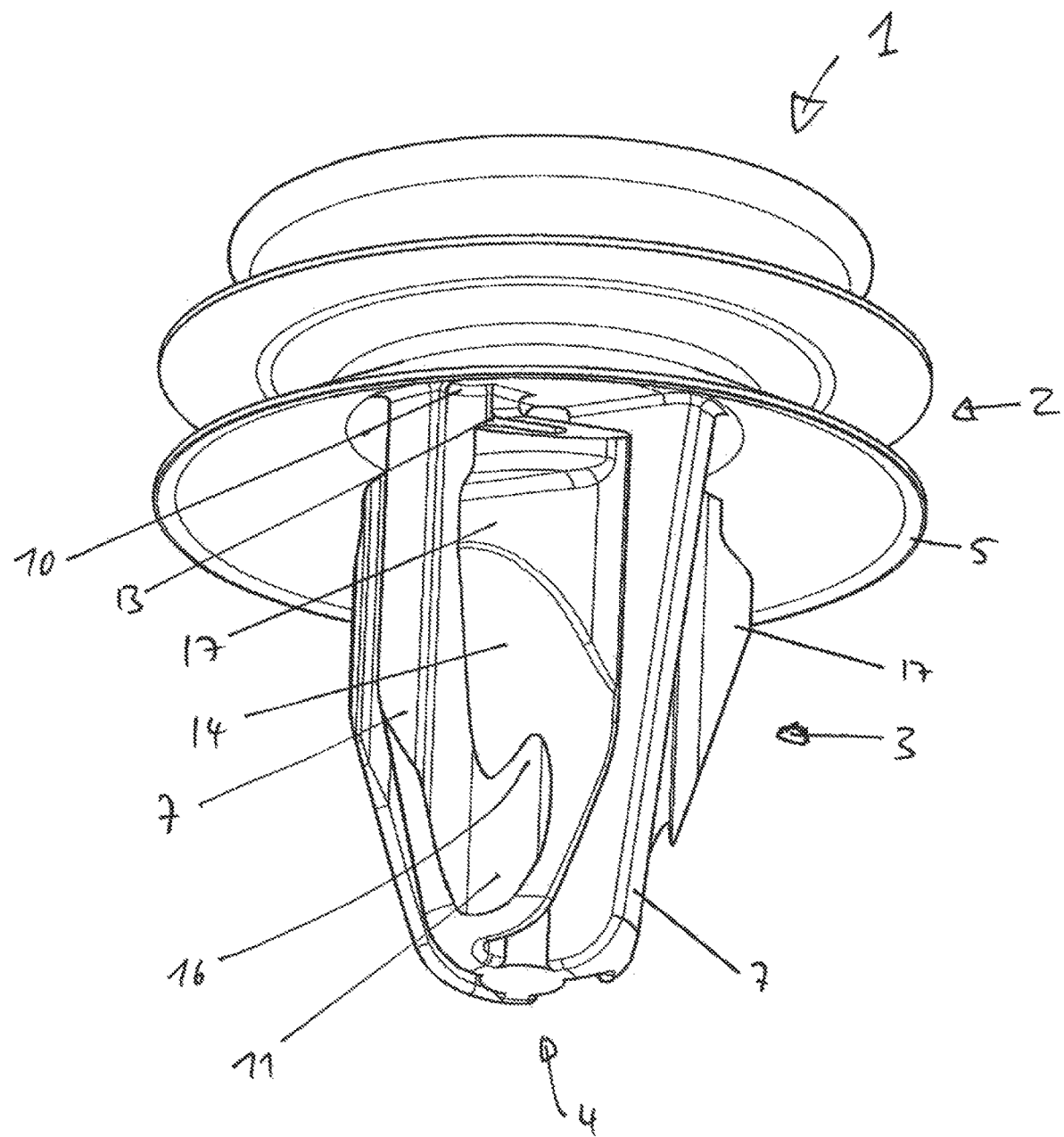
FIG. 5 shows a perspective view of the clip according to FIG. 1 in a perspective view at a slant from below.

The first section 14 is connected at least in sections directly to the head 2. FIGS. 4 and 5 show particularly clearly that the first section 14 is connected to the head 2 over less than 30%, namely over approximately 15% of its extent from the connection to the rib 7 to the transition to the second section in the area of the head 2, but, in the process, it is at the same time connected to the head 2 over more than 5%, namely over approximately 15% of its extent from the connection to the rib 7 to the transition to the second section in the area of the head 2.

In the view of FIG. 2, it can be seen that, for the ribs 7, the distance between the base 8 of the respective rib 7 and the end 9 of the respective rib 7 in planes perpendicular to the longitudinal axis B remains the same over most of their longitudinal extent in the direction parallel to the longitudinal axis B. In other words: The end face 15 of the rib extends over most of the longitudinal extent of the rib 7 in vertical direction. It is only in the direction of the tip 4 that the distance between the base 8 and the end 9 of the rib 7 decreases. The rib 7 tapers in the direction of the end of the shank 3.

By means of two circles whose center is the center of the shank 3, FIG. 3 shows that, for all the ribs 7 except for one, the maximum radial distance between the base 8 of the respective rib 7 and the end 9 of the respective rib 7 is the same, while for one rib, namely the rib which in the view of FIG. 3 is approximately in the nine o'clock position, the maximum distance between the base 8 of the rib 7 and the end 9 of the rib 7 is different from the maximum distance between the base 8 of the other ribs 7 and the respective ends 9 of the other ribs 7. The maximum distance of the one rib is smaller than the maximum distance of the other ribs. The different ends 9 of the ribs make it possible to define a preferential removal direction. It should be assumed that, in the case of sharp edges of the hole in which the clip is inserted, the radially outwardly directed ends of the ribs are abraded each time the clip is pulled out at a slant. Should the clip be pulled out via the flat side of the rib, then the pointed ends of the other two ribs are abraded. However, due to the shape, the amount of ablated material is very small.

FIG. 3 moreover shows that the first section 13 of the respective elastic arm 11 is designed to be plate-like and that the side 12 of the rib 7 from which the first section 13 protrudes is designed to be flat, wherein the first section 13 is not at a right angle with respect to the side 12 of the rib 7, but is rather at an angle alpha of approximately 60°.

In particular, the view of FIG. 1 shows that, in a direction parallel to the longitudinal axis B, at the end of the first section 13 which is connected to the rib 7, the length of the first section 13 of the elastic arm 11 is approximately of the same as the length of the rib 7 in a direction parallel to the longitudinal axis B. In the area of the tip 4, the first section 13 has a slight rounding 15. At the same time, it can be seen clearly in FIG. 1 that the extent of the second section 14 of the elastic arm 11 in a direction parallel to the longitudinal axis B is smaller than the length of the rib 7 in a direction parallel to the longitudinal axis B. Furthermore, it can be seen that the extent of the second section 13 of the elastic arm 11 in a direction parallel to the longitudinal axis B on the portion which is connected to the first section 13 is smaller than in a portion of the second section 14 which is located further along the extent of the second section 14 from the first section 13. The transition between the first section 13 and the second section 14 is formed by a narrowing 16.

FIG. 1 moreover shows that the second section 14 has a bulging portion 17 which bulges outward.

In particular, FIG. 2 shows that the clip 1 is designed as a single part, produced in particular by means of the injection molding method.

FIG. 3 shows the angle BETA between the first section 13 and the second section 14 of the elastic arm 11, which covers approximately 45° in the embodiment represented in FIG. 3.

In addition, FIG. 3 shows that the bulge 17 towards the head 2 is designed with an edge 20. In the direction of the tip 4, the bulge 17 transitions into a slanted surface 21 which tapers towards the tip 4. As can be seen particularly well in FIG. 5, the peripheral surface of the bulge 17 is designed in sections like a section of a cylinder.

FIGS. 6 to 10 illustrate how the cross-sectional geometry of the clip changes towards the tip 4.

The invention claimed is:

1. A clip with a head and with a shank extending along a longitudinal axis from the head, in which at least two ribs are provided, wherein each rib extends from a base of the respective rib on the shank to an end of the respective rib radially spaced from the base of the respective rib,
    wherein each rib is connected at least in sections directly to the head,
    wherein each rib has an elastic arm which protrudes from the respective rib,
    wherein each rib has a side which extends between the base of the rib and the end of the rib, wherein the elastic arm of the rib protrudes from the side of the rib,
    wherein at least one elastic arm of at least one has a first section and a second section, wherein the first section is connected at one end to the rib and at its other end to the second section, wherein the second section extends in a different direction from the first section,
    wherein the first section is connected at least in sections directly to the head, and
    wherein the extent of the second section of each elastic arm in a direction parallel to the longitudinal axis on the portion which is connected to the first section is smaller than the extent of the second section of each elastic arm in a direction parallel to the longitudinal axis in a portion of the second section which is located further along the extent of the second section from the first section.

2. The clip according to claim 1, wherein the maximum radial extension of a first rib of the at least two ribs between the base of the first rib and the end of the first rib is different from the maximum radial extension of a second rib of the at least two ribs between the base of the second rib and the end of the second rib.

3. The clip according to claim 1, wherein at least three ribs are provided and wherein for all the ribs except one rib the maximum radial distance between the base of the respective rib and the end of the respective rib is the same, while for the one rib the maximum distance between the base of the rib and the end of the rib is different from the maximum radial distance between the base of the other ribs and the respective ends of the other ribs.

4. The clip according to claim 1, wherein the first section of each elastic arm has a plate-like design and in which the side of each rib is designed to be flat and in which the first section is not perpendicular to the side of the rib.

5. The clip according to claim 1, wherein each rib is stiff.

6. The clip according to claim 1, wherein the length of at least one rib in the direction of the longitudinal axis of the shank or parallel to the longitudinal axis of the shank is the same as the extent of the shank in the direction of the longitudinal axis of the shank.

7. The clip according to claim 1, wherein at least one rib tapers in the direction of the end of the shank.

8. The clip according to claim 1, wherein the length of the first section of each elastic arm in a direction parallel to the longitudinal axis at the end of the first section which is connected to the rib is smaller than the length of the rib in a direction parallel to the longitudinal axis.

9. The clip according to claim 1, wherein the second section has a bulging portion which bulges outward.

10. The clip according to claim 9, wherein the bulging portion has an edge which represents the transition of a peripheral surface of the bulging portion into a surface of the second section facing the head.

11. The clip according to claim 1, wherein at least three ribs are provided and wherein for all the ribs except one rib the maximum radial distance between the base of the respective rib and the end of the respective rib is the same, while for the one rib the maximum distance between the base of the rib and the end of the rib is different from the maximum radial distance between the base of the other ribs and the respective ends of the other ribs.

12. The clip according to claim 1, wherein the first section of the elastic arm has a plate-like design and in which the side of the rib is designed to be flat and in which the first section is not perpendicular to the side of the rib.

13. The clip according to claim 1, wherein each rib is stiff.

14. The clip according to claim 1, wherein the length of at least one rib in the direction of the longitudinal axis of the shank or parallel to the longitudinal axis of the shank is the same as the extent of the shank in the direction of the longitudinal axis of the shank.

15. The clip according to claim 1, wherein at least one rib tapers in the direction of the end of the shank.

16. A clip with a head and with a shank extending along a longitudinal axis from the head, in which at least two ribs are provided, wherein each rib extends from a base of the respective rib on the shank to an end of the respective rib radially spaced from the base of the respective rib,
    wherein each rib is connected at least in sections directly to the head,
    wherein each rib has an elastic arm which protrudes from the respective rib,
    wherein each rib has a side which extends between the base of the rib and the end of the rib, wherein the elastic arm of the rib protrudes from the side of the rib,
    wherein the maximum radial extension of a first rib between the base of the first rib and the end of the first rib is different from the maximum radial extension of a second rib between the base of the second rib and the end of the second rib.

17. The clip according to claim 16, wherein at least one elastic arm has a first section and a second section, wherein the first section is connected at one end to the rib and at its other end to the second section, wherein the second section extends in a different direction from the first section.

18. A clip with a head and with a shank extending along a longitudinal axis from the head, in which at least two ribs are provided, wherein each rib extends from a base of the respective rib on the shank to an end of the respective rib radially spaced from the base of the respective rib,
    wherein each rib is connected at least in sections directly to the head,
    wherein each rib has an elastic arm which protrudes from the respective rib,
    wherein each rib has a side which extends between the base of the rib and the end of the rib, wherein the elastic arm of the rib protrudes from the side of the rib,
    wherein at least one elastic arm has a first section and a second section, wherein the first section is connected at one end to the rib and at its other end to the second section, wherein the second section extends in a different direction from the first section, and
    wherein at least three ribs are provided and wherein for all the ribs except one rib the maximum radial distance between the base of the respective rib and the end of the respective rib is the same, while for one rib the maximum distance between the base of the rib and the end of the one rib is different from the maximum radial distance between the base of the other ribs and the respective ends of the other ribs.

19. The clip according to claim 18, wherein the first section is connected at least in sections directly to the head.

* * * * *